United States Patent
Huang et al.

(10) Patent No.: US 8,259,943 B2
(45) Date of Patent: Sep. 4, 2012

(54) METHOD FOR DECRYPTING SERIAL TRANSMISSION SIGNAL

(75) Inventors: David Huang, Taoyuan (TW); Chi-Feng Lee, Taoyuan (TW); Hsiu-Hung Chou, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 783 days.

(21) Appl. No.: 12/206,055

(22) Filed: Sep. 8, 2008

(65) Prior Publication Data
US 2009/0074186 A1    Mar. 19, 2009

(30) Foreign Application Priority Data
Sep. 17, 2007  (TW) .............................. 96134749 A

(51) Int. Cl.
*H04K 1/00* (2006.01)
(52) U.S. Cl. ............. 380/255; 708/44; 377/49; 710/100
(58) Field of Classification Search .................. 380/255; 708/444; 377/49; 710/100
See application file for complete search history.

(56) References Cited

U.S. PATENT DOCUMENTS

| | | | | |
|---|---|---|---|---|
| 3,757,261 A * | 9/1973 | Sather | ............................ | 708/444 |
| 4,023,019 A * | 5/1977 | Leibowitz et al. | ............. | 708/444 |
| 4,246,642 A * | 1/1981 | Magill | ........................... | 708/444 |
| 4,336,600 A | 6/1982 | Houdard et al. | | |
| 4,644,502 A * | 2/1987 | Kawashima | .................. | 365/219 |
| 4,747,139 A * | 5/1988 | Taaffe | .............................. | 380/44 |
| 4,841,466 A * | 6/1989 | Christopher | .................. | 708/444 |
| 5,313,469 A * | 5/1994 | Adham et al. | .................. | 714/724 |
| 5,440,702 A * | 8/1995 | Brewer et al. | ................. | 712/223 |
| 5,507,001 A * | 4/1996 | Nishizawa | ........................ | 710/5 |
| 5,621,901 A * | 4/1997 | Morriss et al. | ................. | 710/305 |
| 5,623,610 A * | 4/1997 | Knoll et al. | .................... | 710/300 |
| 5,694,555 A * | 12/1997 | Morriss et al. | ................. | 710/100 |
| 5,742,847 A * | 4/1998 | Knoll et al. | ..................... | 710/46 |
| 5,903,737 A * | 5/1999 | Han | .............................. | 710/100 |
| 6,282,558 B1 * | 8/2001 | Kabuo | .......................... | 708/552 |
| 6,861,981 B2 | 3/2005 | Park et al. | | |
| 6,915,335 B1 | 7/2005 | Chen et al. | | |
| 7,373,523 B1 * | 5/2008 | Moritz | .......................... | 713/193 |
| 7,441,060 B2 * | 10/2008 | Gower et al. | ................. | 710/110 |
| 7,526,655 B2 * | 4/2009 | Gammel et al. | .............. | 713/189 |

(Continued)

FOREIGN PATENT DOCUMENTS
EP        0304841        3/1989

OTHER PUBLICATIONS
English Abstract for EP0304841.
(Continued)

*Primary Examiner* — April Shan
(74) *Attorney, Agent, or Firm* — Thomas|Kayden

(57) ABSTRACT

A method for decrypting a serial transmission signal includes the following steps. First, the serial transmission signal including a serial data signal and a serial clock signal is received. Then, m bits are sequentially read from the serial data signal according to the serial clock signal. Next, values corresponding to the m bits are generated. Thereafter, each value is added to a content value of a register by an addition operation to obtain an addition result, and then the addition result replaces the content value and is stored in the register.

14 Claims, 5 Drawing Sheets

U.S. PATENT DOCUMENTS

| | | | | |
|---|---|---|---|---|
| 7,610,423 | B2* | 10/2009 | Gower et al. | 710/110 |
| 7,673,338 | B1* | 3/2010 | Osburn et al. | 726/12 |
| 7,697,692 | B2* | 4/2010 | Takata et al. | 380/277 |
| 7,826,402 | B2* | 11/2010 | Lin | 370/282 |
| 2002/0133631 | A1* | 9/2002 | Yun | 709/251 |
| 2004/0120516 | A1* | 6/2004 | Chen et al. | 380/28 |
| 2005/0050348 | A1* | 3/2005 | Chin | 713/200 |
| 2007/0032193 | A1* | 2/2007 | Wada et al. | 455/41.2 |
| 2007/0127431 | A1* | 6/2007 | Eun et al. | 370/342 |
| 2007/0294509 | A1* | 12/2007 | Sauer | 712/14 |
| 2008/0049934 | A1* | 2/2008 | Onoda et al. | 380/201 |
| 2008/0288808 | A1* | 11/2008 | Moyer | 714/2 |

OTHER PUBLICATIONS

Chinese language office action dated May 31,2011.

European Office Action dated Mar. 13, 2012.

Ali, L., et al.; "Design of a Micro-UART for SoC Application;" Computers and Electrical Engineering 30; 2004; pp. 257-268.

Mathis, J.R.; "Serial to Parallel Converter;" IBM Technical Disclosure bulletin; vol. 03-75; Mar. 1975; pp. 2985.

Taiwanese language office action dated Jun. 5, 2012.

* cited by examiner

METHOD FOR DECRYPTING SERIAL TRANSMISSION SIGNAL

This application claims the benefit of Taiwan application Serial No. 96134749, filed Sep. 17, 2007, the subject matter of which is incorporated herein by reference.

BACKGROUND OF THE INVENTION

1. Field of the Invention

The invention relates in general to a method for decrypting a signal, and more particularly to a method for decrypting a serial transmission signal.

2. Description of the Related Art

The serial transmission technology has been widely adopted between a transmitting terminal and a receiving terminal, and a serial transmission signal therebetween includes a serial data signal and a serial clock signal. FIG. 1 (Prior Art) is a schematic illustration showing a conventional serial transmission signal. Referring to FIG. 1, the serial transmission signal includes a serial data signal Data and a serial clock signal SCK. The serial data signal Data includes multiple bits, such as a set of command bits, a set of address bits, a set of data bits or a set of special bits. The set of special bits may include a start bit (start), an acknowledging bit (ack) or a stop bit (stop). The serial clock signal SCK includes multiple timing pulses, and each bit of the serial data signal Data is read, based on each timing pulse, in an edge triggered or level triggered manner.

FIG. 2 (Prior Art) is a flow chart showing a conventional method for decrypting the serial transmission signal. First, in step 210, a serial transmission signal including a serial data signal and a serial clock signal is received. The serial clock signal includes multiple timing pulses. Next, in step 220, an interrupt service function is triggered to read the corresponding bit, based on the timing pulse, in the edge triggered or level triggered manner.

As shown in FIG. 1, a main program of the receiving terminal triggers the interrupt service function at a rising edge (time t1) of one timing pulse of the serial clock signal SCK. At this time, the main program pushes a program address to a stack, and then executes the interrupt service function and jumps to enter a sub-program to perform a reading operation. Thereafter the corresponding bit is completely read before a falling edge (time t2) of the same timing pulse, and then the program address is popped from the stack so as to perform the original main program.

Thereafter, in step 230, it is determined whether the received bit is a command bit, an address bit, a data bit or a special bit, and the received bit then is stored to a corresponding position of a register by way of rotation. FIG. 3 (Prior Art) is a schematic illustration showing the conventional method for storing data to the register by way of rotation. As shown in FIG. 3, if the receiving terminal receives thirteen data bits as one data byte, the register 300 is a thirteen-bit register and the initial value of the register 300 is $(0\ 0\ 0\ \ldots\ 0\ 0)_2$, for example.

If the data byte is, for example, $(b_{12}\ b_{11}\ b_{10}\ \ldots\ b_1\ b_0)_2 = (1\ 0\ 1\ \ldots\ 1\ 0)_2$, the thirteen data bits are sequentially stored to corresponding positions of the register 300 by way of rotation. First, the bit $b_{12}$ is stored to the memory cell $a_0$. Next, the bit $b_{12}$ stored to the memory cell $a_0$ is shifted to the memory cell $a_1$ to complete a first rotation operation. Thereafter, the bit $b_{12}$ stored to the memory cell $a_1$ is shifted to the memory cell $a_2$ to complete a second rotation operation. After twelve rotation operations have been performed, the bit $b_{12}(=1)$ is stored to the memory cell $a_{12}$. Thereafter, the bit $b_{11}(=0)$ is stored to the memory cell $a_{11}$ according to eleven rotation commands. Then, the bit $b_1(=1)$ is stored to the memory cell $a_1$ according to one rotation command. The bit $b_0(=0)$ is finally stored to the memory cell $a_0$.

In step 240, the receiving terminal determines whether the storing operation finishes after each bit is stored. If the storing operation is not finished yet, the procedure goes back to the step 220 to continue reading the subsequent bits. If the storing operation is finished, the procedure enters step 250. In the step 250, the receiving terminal decrypts the byte stored in the register and performs a corresponding process.

The conventional method for decrypting the serial transmission signal has to push the program address to the stack in the step 220 so as to trigger the interrupt service function and jump to the sub-program, and also has to pop the program address from the stack so as to jump back to the main program. Thus, the processor of the receiving terminal needs a lot of system clock cycles to finish the operation of receiving one bit. Therefore, if the number of bits of the serial transmission signal increases and the transmission speed is required to be higher, the calculation loading of the processor of the receiving terminal will get higher and the efficiency of the processor will be reduced. In addition, if the number of bits of the serial transmission signal increases, the number of rotation commands to be performed in the step 230 will also increase so that the calculation loading of the processor thus get higher. Meanwhile, the cost is increased and the power consumption of the processor of the receiving terminal is increased.

SUMMARY OF THE INVENTION

The invention is directed to a method for decrypting a serial transmission signal, in which one bit is read in one cycle of a serial clock signal without using an interrupt service function and then stored by an addition operation. Therefore, the serial transmission signal can be rapidly decrypted, the calculation loading of a processor can be decreased, and the power consumption of the processor can be lowered.

According to a first aspect of the present invention, a method for decrypting a serial transmission signal comprises the following steps. First, the serial transmission signal including a serial data signal and a serial clock signal is received. Next, m bits are sequentially read from the serial data signal according to the serial clock signal. Then, values corresponding to the m bits are generated. Afterwards, each of the values is added to a content value of a register by an addition operation to obtain an addition result, and then the content value is replaced with the addition result and the addition result is stored to the register.

According to a second aspect of the present invention, a method for decrypting a serial transmission signal applied to a receiving terminal comprises the following steps. First, the serial transmission signal including a serial data signal and a serial clock signal is received. Next, it is determined whether a logic level of the serial clock signal is equal to a default value. Then, a bit is read from the serial data signal when the logic level of the serial clock signal is equal to the default value. Afterwards, the bit is stored to a register.

The invention will become apparent from the following detailed description of the preferred but non-limiting embodiments. The following description is made with reference to the accompanying drawings.

DETAILED DESCRIPTION OF THE INVENTION

The invention provides a method for decrypting a serial transmission signal, in which one bit is read in one cycle of a serial clock signal without using an interrupt service function and then stored to a corresponding position of a register by an addition operation. Therefore, the calculation loading and the power consumption of a receiving terminal can be decreased, the serial transmission signal can be rapidly decrypted, and the cost of the receiving terminal can be decreased.

Figure 1:
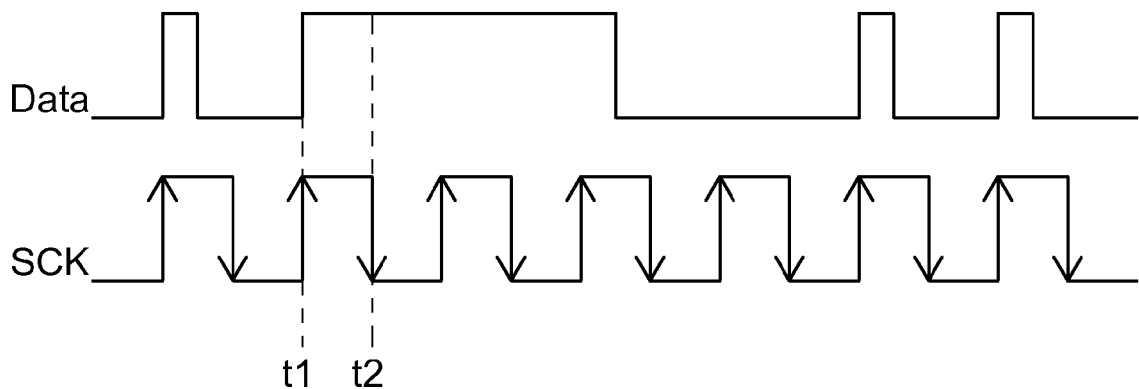
FIG. 1 (Prior Art) is a schematic illustration showing a conventional serial transmission signal.
Figure 2:
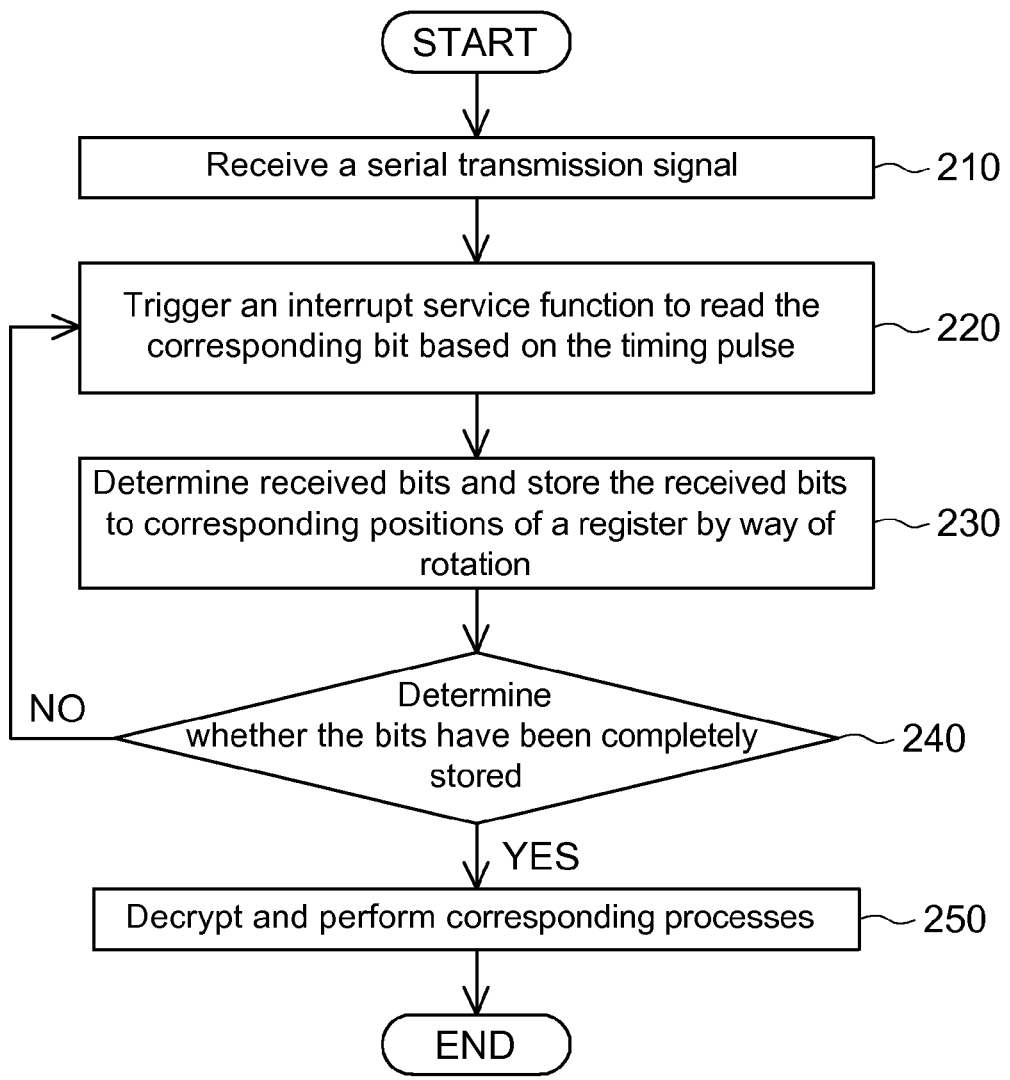
FIG. 2 (Prior Art) is a flow chart showing a conventional method for decrypting the serial transmission signal.
Figure 3:
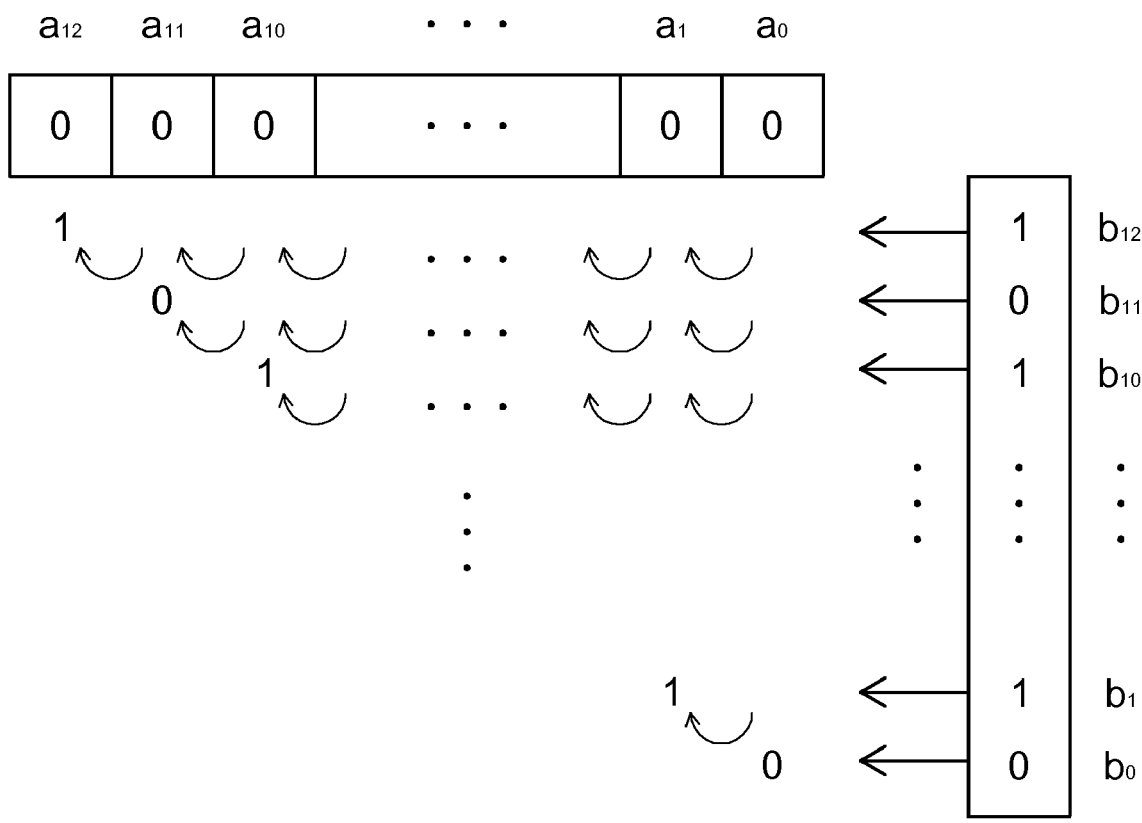
FIG. 3 (Prior Art) is a schematic illustration showing the conventional method for storing data to a register by way of rotation.
Figure 4:
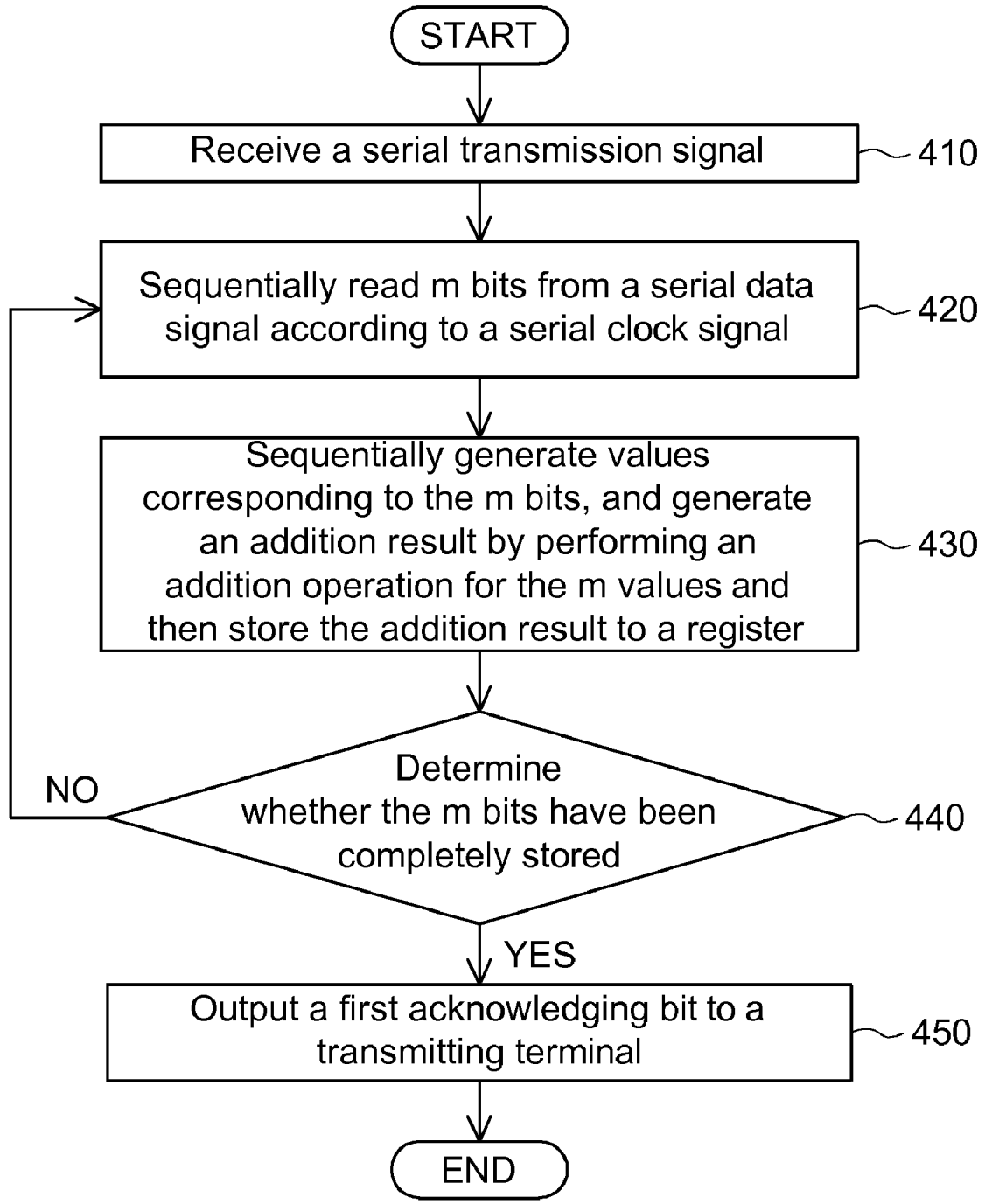
FIG. 4 is a flow chart showing a method for decrypting a serial transmission signal according to a first embodiment of the invention.

FIG. 4 is a flow chart showing a method for decrypting a serial transmission signal according to a first embodiment of the invention. As shown in FIG. 4, the method is applied to a receiving terminal. The receiving terminal decrypts data of each field according to a protocol of the serial transmission signal. This protocol may be, for example, a protocol for a serial transmission interface, such as a serial peripheral interface (SPI), an inter-integrated circuit (I2C) or a universal asynchronous receiver/transmitter (UART).

First, in step 410, the serial transmission signal including a serial data signal and a serial clock signal is received. Then, in step 420, m bits are sequentially read from the serial data signal according to the serial clock signal, wherein m is a positive integer. The m bits may form, for example, an address byte or a data byte. In addition, in the step 420, the receiving terminal can read the bits from the serial data signal, based on timing pulses contained in the serial clock signal, in an edge triggered or level triggered manner.

Next, in step 430, values corresponding to the m bits are sequentially generated, and an addition result is generated by performing an addition operation for the m values and then stored to a register. In two examples, the addition operation is performed for the m values. In the first example, the addition operation is an arithmetic addition (ADD) operation. It is assumed that the m bits of the first field are sequentially $b_{m-1}$, $b_{m-2}$ ... $b_1$ and $b_0$. When $b_{m-1}$ is equal to logic 1, the value of $2^{m-1}$ is added to a content value stored in the register by the arithmetic addition operation. When the values of $b_{m-2}$ ... $b_1$ and $b_0$ are equal to the logic 1, the values of $2^{m-2}$ ..., $2^1$ and $2^0$ are respectively added to the content value stored in the register by the arithmetic addition operation.

In addition to adding the values together in the first example, the m bits may also be stored by way of a logic AND operation. In the second example, the addition operation is a logic AND operation. When $b_{m-1}$ is equal to logic 1, the value of $(1\ 0\ 0 \ldots 0\ 0)_2$ is added to a content value stored in the register by the AND addition operation. When the values of the $b_{m-2}$ ... $b_1$ and $b_0$ are equal to logic 1, the values of $(0\ 1\ 0 \ldots 0\ 0)_2$, $(0\ 0\ 1 \ldots 0\ 0)_2$, ... $(0\ 0\ 0 \ldots 1\ 0)_2$ and $(0\ 0\ 0 \ldots 0\ 1)_2$ are respectively added to the content value stored in the register by the logic AND operation. Consequently, the m bits can be stored to the register without multiple rotation commands, thereby decreasing the calculation loading of the receiving terminal. In addition, unlike the conventional method, in which the numbers of rotations for different bits are different, the numbers of addition operations according to the present invention for different bits are the same.

Furthermore, in step 440, it is determined whether the m bits have been completely stored. If the bits have not been completely stored, the procedure goes back to the step 420 to continue reading the remaining bits. If the bits have been completely stored, a first acknowledging bit is outputted to a transmitting terminal in step 450.

Figure 5:
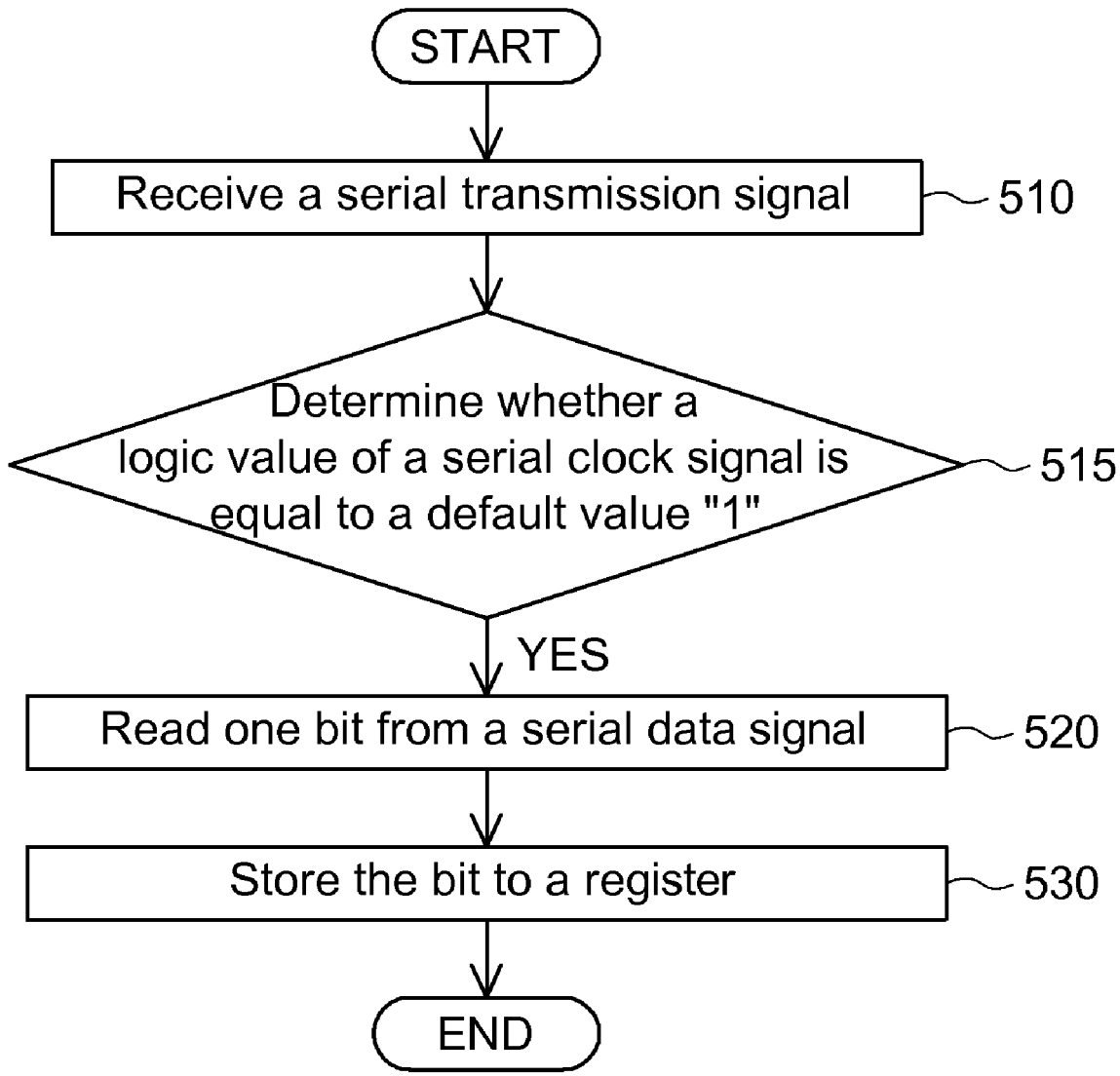
FIG. 5 is a flow chart showing a method for decrypting a serial transmission signal according to a second embodiment of the invention.

FIG. 5 is a flow chart showing a method for decrypting a serial transmission signal according to a second embodiment of the invention. As shown in FIG. 5, this method is applied to a receiving terminal. The receiving terminal decrypts bit data in each field according to a protocol of the serial transmission signal. First, in step 510, the serial transmission signal including a serial data signal and a serial clock signal is received.

Next, in step 515, it is determined whether a logic level of the serial clock signal is equal to a default value "1". Then, in step 520, when the logic level of the serial clock signal is equal to the default value "1", one bit is read from the serial data signal. The bit is, for example, one bit of an address byte or one bit of a data byte.

In this embodiment, the method is to read one bit from the serial data signal in one serial clock cycle at the receiving terminal without using an interrupt service function. That is, a main program of the receiving terminal has included program codes for reading the data bit from the serial data signal. The main program is executed by a processor of the receiving terminal, for example, and the frequency of a system clock signal of the processor is higher than that of the serial clock signal. Consequently, the main program can directly perform the operation of reading the serial data signal in a serial clock cycle under the control of the system clock signal. The processor can complete the operation of reading the serial data signal without executing any interrupting process.

Compared with the conventional method, which needs to call the interrupt service function to make the processor perform the interrupting process, the method of this embodiment can omit the conventional pushing, jumping and popping operations for the program address. Therefore, the time of waiting for processing the received data can be effectively shortened so that the speed for receiving data is increased.

In addition, both of the rising edges and the falling edges of the serial clock signal can trigger the interrupt service function in the conventional method, so the conventional method has to finish the operation of reading one bit of data between a rising edge and a neighboring falling edge of the serial clock signal. Since this embodiment needs not to perform the interrupt service function, it is unnecessary to complete the operation of reading one bit of data between a rising edge and a falling edge at one timing pulse of the serial clock signal (typically equal to one half of the serial clock cycle), like the prior art. Therefore, this embodiment only has to finish the operation of reading one bit of data in one serial clock cycle. Consequently, this embodiment has sufficient time for reading one bit of data. More particularly, the main program may further execute operations associated with a read bit in the remaining time after reading one bit during one serial clock cycle of the serial clock signal, thereby correspondingly increasing the efficiency of the receiving terminal.

Thereafter, in step 530, the bit is stored in the register.

Figure 6:
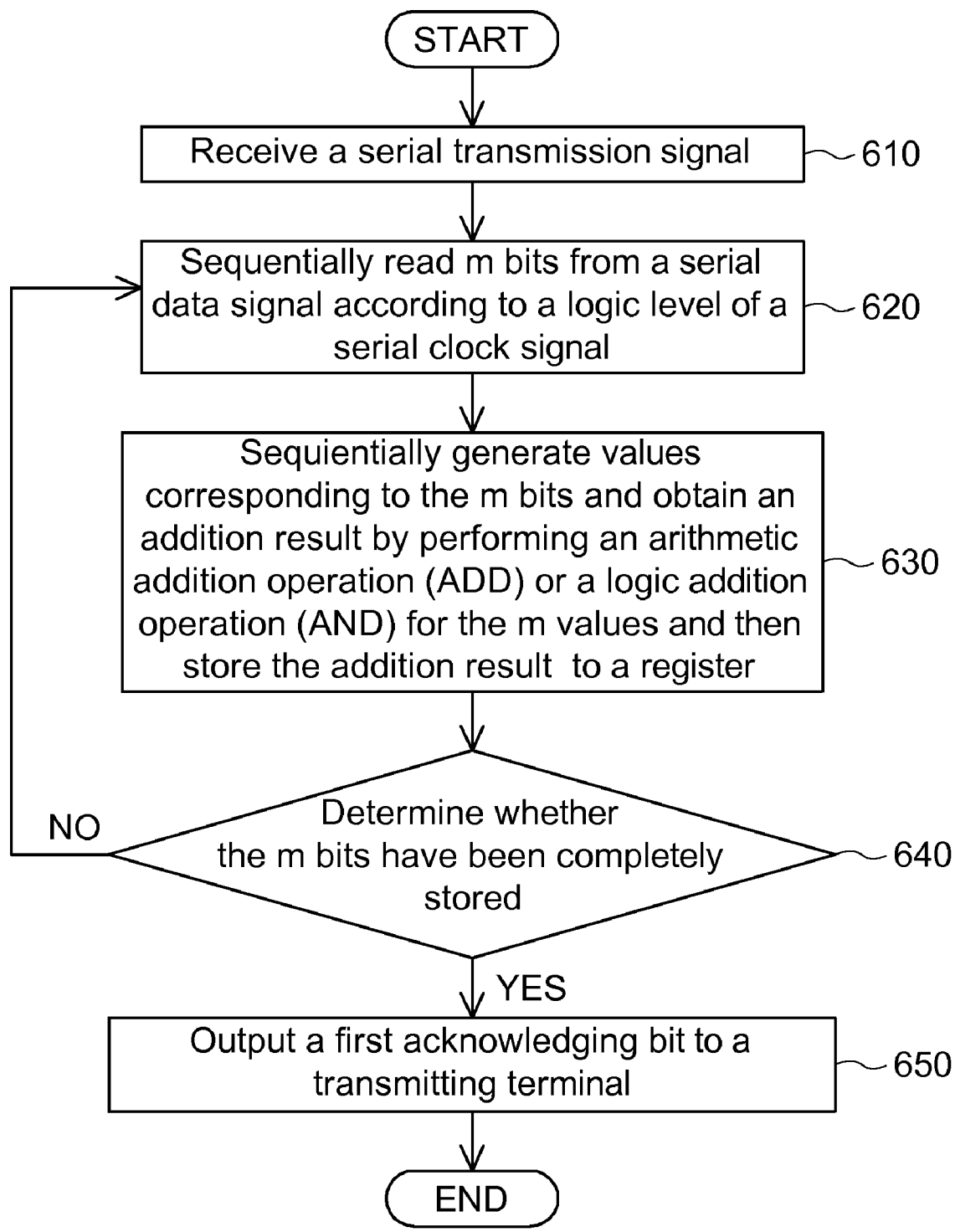
FIG. 6 is a flow chart showing a method for decrypting a serial transmission signal according to a third embodiment of the invention.

FIG. 6 is a flow chart showing a method for decrypting a serial transmission signal according to a third embodiment of the invention. As shown in FIG. 6, this embodiment combines the features of the first and second embodiments. First, in step 610, the serial transmission signal including a serial data signal and a serial clock signal is received. Next, in step 620, m bits are read from the serial data signal according to a logic level of the serial clock signal, wherein m is a positive integer, and one serial clock cycle corresponds to one bit. The m bits form an address byte or a data byte, for example. In the step 620, a receiving terminal can read one bit from the serial data signal in one serial clock cycle without triggering an interrupt service function.

Then, in step 630, values corresponding to the m bits are sequentially generated, and an addition result is obtained by performing an arithmetic addition operation (ADD) or a logic addition operation (AND) for the m values, and then stored to a register. In step 640, it is determined whether the m bits have been completely stored or not. If not, the procedure goes back to the step 620 to continue reading the remaining bits. If yes, a first acknowledging bit is outputted to a transmitting terminal in step 650.

In the method for decrypting the serial transmission signal according to the embodiments of the invention, the receiving terminal, in advance, sets the field of the bits of the serial data signal to be received. Therefore, the receiving terminal can read one bit of data in one serial clock cycle of the serial clock signal without using any interrupt service function, pushing command or jumping command and without waiting. In addition, it is unnecessary to finish a reading operation for one bit between a rising edge and a falling edge at one timing pulse of the serial clock signal, so the receiving terminal can further execute associated operations during the remaining time in one serial clock cycle, thereby correspondingly increasing the efficiency of the receiving terminal.

In addition, the method for decrypting the serial transmission signal according to the invention further directly stores each received bit to one corresponding position in the register by the addition operation. Thus, multiple rotation commands can be omitted, the calculation loading and the power consumption of the receiving terminal can be reduced, and the serial transmission signal can be rapidly decrypted; in addition, the cost and the power loss of the receiving terminal can be decreased.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for decrypting a serial transmission signal, the method comprising:
   receiving the serial transmission signal, which comprises a serial data signal and a serial clock signal;
   sequentially reading m bits from the serial data signal according to the serial clock signal;
   generating values corresponding to the m bits;
   adding each of the values to a content value of a register by an operation of addition to obtain a result of addition, and then replacing the content value with the result of addition and storing the result of addition to the register; and
   decrypting the result of addition stored in the register and performing a corresponding process.

2. The method according to claim 1, wherein the addition operation is an arithmetic addition (ADD) operation, the m bits are sequentially $b_{m-1}$, $b_{m-2}$ ... $b_1$ and $b_0$, a value $2^{m-1}$ is added to the content value of the register when a value of $b_{m-1}$ is equal to 1, and values of $2^{m-2}$ ..., $2^1$ and $2^0$ are respectively added to the content value of the register when values of the $b_{m-2}$ ... $b_1$ and $b_0$ are equal to 1 respectively.

3. The method according to claim 1, wherein the operation of addition is a logic AND operation, the m bits are sequentially $b_{m-1}$ ... $b_1$ and $b_0$, a value of $(1\ 0\ 0\ ...\ 0\ 0)_2$ is added to the content value of the register when a value of $b_{m-1}$ is equal to 1, and values of $(0\ 1\ 0\ ...\ 0\ 0)_2$, $(0\ 0\ 1\ ...\ 0\ 0)_2$, ... $(0\ 0\ 0\ ...\ 1\ 0)_2$, $(0\ 0\ 0\ ...\ 0\ 1)_2$ are respectively added to the content value of the register when values of the $b_{m-2}$ ... $b_1$ and $b_0$ are equal to 1 respectively.

4. The method according to claim 1, wherein an initial value of the content value of the register is zero.

5. The method according to claim 1, being performed by a receiving terminal without using an interrupt service function, wherein a main program of the receiving terminal reads one bit in one serial clock cycle of the serial clock signal.

6. The method according to claim 1, wherein the m bits form an address byte.

7. The method according to claim 1, wherein the m bits form a data byte.

8. The method according to claim 1, further comprising:
   determining whether the m bits have been completely stored; and
   outputting a first acknowledging bit to a transmitting terminal when the m bits have been completely stored.

9. A method for decrypting a serial transmission signal applied to a receiving terminal, the method comprising:
   receiving the serial transmission signal, which comprises a serial data signal and a serial clock signal;
   determining whether a logic level of the serial clock signal is equal to a default value;
   reading a bit from the serial data signal when the logic level of the serial clock signal is equal to the default value;
   generating a value corresponding to the bit;
   adding the value and a content value of a register by an operation of addition to obtain a result of addition, and replacing the content value with the result of addition and storing the result of addition into the register; and
   decrypting the result of addition stored in the register and performing a corresponding process.

10. The method according to claim 9, wherein the operation of addition is an arithmetic addition (ADD) operation.

11. The method according to claim 9, wherein the operation of addition is a logic AND operation.

12. The method according to claim 9, wherein a cycle of the serial clock signal is equal to a sum of an enable period and a disable period of the serial clock signal.

13. The method according to claim 9, wherein the bit is one bit of an address byte.

14. The method according to claim 9, wherein the bit is one bit of a data byte.

* * * * *